United States Patent [19]

Fenton

[11] Patent Number: 5,800,115
[45] Date of Patent: Sep. 1, 1998

[54] MOTOR DRIVEN TILTABLE CARGO DECK

[76] Inventor: Barry Fenton, 9036-108 Street, Grande Prairie, Alberta, Canada, T8V 4C8

[21] Appl. No.: 183,856

[22] Filed: Jan. 21, 1994

[51] Int. Cl.$^6$ .................................................. B60P 1/04
[52] U.S. Cl. ............................................ 414/477; 414/537
[58] Field of Search .............................. 414/477–479, 414/522, 537, 538, 462; 14/69.5, 71.1, 71.5

[56] References Cited

U.S. PATENT DOCUMENTS

| | | | |
|---|---|---|---|
| 1,304,026 | 5/1919 | Craymer | 414/522 |
| 5,160,236 | 11/1992 | Redding et al. | 414/537 |
| 5,305,486 | 4/1994 | Smith et al. | 414/537 X |
| 5,340,267 | 8/1994 | Stoll et al. | 414/537 |
| 5,394,583 | 3/1995 | Plate | 414/538 X |

FOREIGN PATENT DOCUMENTS

| | | | |
|---|---|---|---|
| 556399 | 3/1931 | France | 414/477 |
| 320326 | 2/1970 | Sweden | 414/477 |

Primary Examiner—David A. Bucci
Attorney, Agent, or Firm—Anthony R. Lambert

[57] ABSTRACT

A motor driven tiltable cargo deck includes a support frame having a pair of opposed sides, a first end and a second end. A first pair of sprockets are mounted to the opposed sides adjacent the first end of the support frame. A second pair of sprockets are mounted to the opposed sides adjacent the second end of the support frame. A pair of continuous chains are rotatably mounted between the first pair of sprockets and the second pair of sprockets. A deck is provided having a first end and a second end. The deck is supported by the support frame and slidably movable from a travel position in which the first end of the deck is adjacent the first end of the support frame to an unloading position in which the second end of the deck rests upon a groundsurface. A pair of linkage arms are provided having a first end and a second end. The first ends are pivotally mounted to the deck adjacent the first end. The second ends are attached to the pair of chains such that the deck moves relative to the support frame upon movement of the chain. The linkage arms exert a resisting force upon the first end of the deck as the second end of the deck is lowered. A drive motor is provided for rotating one of the first pair of sprockets and the second pair of sprockets, thereby rotating the chain to effect movement of the deck relative to the support frame.

1 Claim, 3 Drawing Sheets

MOTOR DRIVEN TILTABLE CARGO DECK

BACKGROUND OF THE INVENTION

Snowmobiles and all terrain vehicles are transported on decks of trucks. These decks are too high to risk damaging the snowmobiles by driving off them an end of the deck. On the other hand, the snowmobiles are too heavy to unload manually. Tiltable cargo decks make the job of loading and unloading snowmobiles easier.

A tiltable cargo deck slides on a support frame. Once the deck has been slid to a fully extended position, a remote end of the support frame serves as a fulcrum about which the cargo deck pivots. A remote end of the cargo deck is then lowered onto a groundsurface. The snowmobile is rolled down the tilted deck surface.

Once the deck is overbalanced on the pivot point at the remote end of the support frame, gravity pulls the second end of deck downwardly resulting in an upward movement of the first end of the deck. When the first end of the deck is held in a track in the support frame this upward movement places a tremendous strain upon the support frame and can distort the track. When the first end of the deck is not held in a track, the deck behaves in a manner analogous to a teeter totter. Motor drive assemblies generally cannot withstand the resulting vertical force component. The solution has been to manually provide support to the second end of the deck. Insofar as is known to the Applicant, all tiltable cargo decks are manually extended. In some cases winches are used to pull the cargo decks back from the extended position into a retracted position.

SUMMARY OF THE INVENTION

What is required is a motor driven tiltable cargo deck.

According to the present invention there is provided a motor driven tiltable cargo deck which includes a support frame having a pair of opposed sides, a first end and a second end. A first pair of sprockets are mounted to the opposed sides adjacent the first end of the support frame. A second pair of sprockets are mounted to the opposed sides adjacent the second end of the support frame. A pair of continuous chains are rotatably mounted between the first pair of sprockets and the second pair of sprockets. A deck is provided having a first end and a second end. The deck is supported by the support frame and slidably movable from a travel position in which the first end of the deck is adjacent the first end of the support frame to an unloading position in which the second end of the deck rests upon a groundsurface. A pair of linkage arms are provided having a first end and a second end. The first ends are pivotally mounted to the deck adjacent the first end. The second ends are attached to the pair of chains such that the deck moves relative to the support frame upon movement of the chain. The linkage arms exert a resisting force upon the first end of the deck as the second end of the deck is lowered. A drive motor is provided for rotating one of the first pair of sprockets and the second pair of sprockets, thereby rotating the chain to effect movement of the deck relative to the support frame.

The motor driven tiltable cargo deck, as described, constitutes an improvement over the prior art. The presence of the linkage arms enables the motor assembly to be used to resist the upward force on the first end of the deck as the second end of the deck is lowered. The linkage arms alter the direction of the force exerted upon the chains as the deck is being lowered to the ground by the drive motor and as such defines a shifting force vector. Even at its most extreme position this force vector is at all times exerting a force which has a sufficient horizontal component to be handled by the motor assembly.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
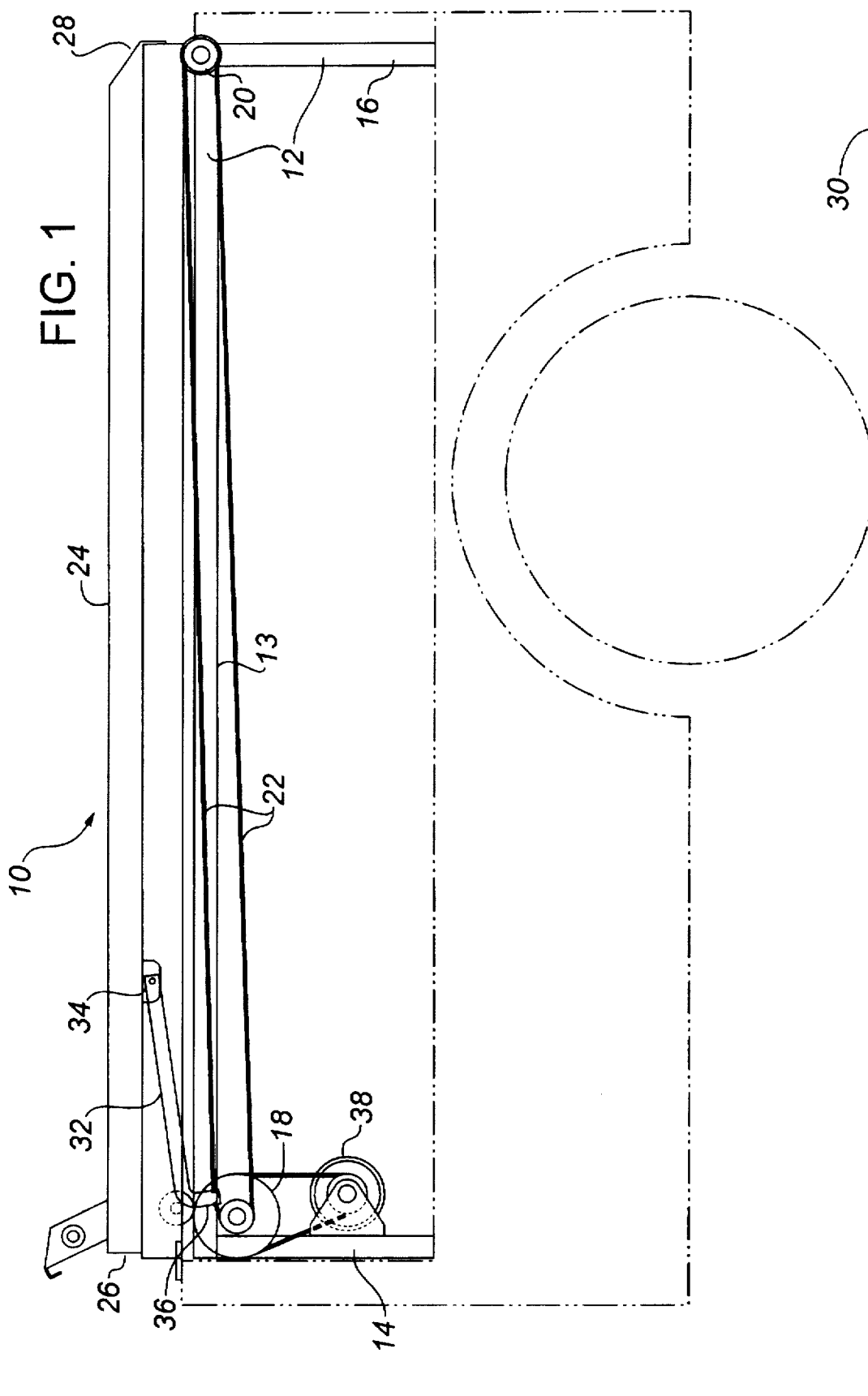
FIG. 1 is a longitudinal section view of a motor driven tiltable cargo deck, with the deck in a transport position.
Figure 2:
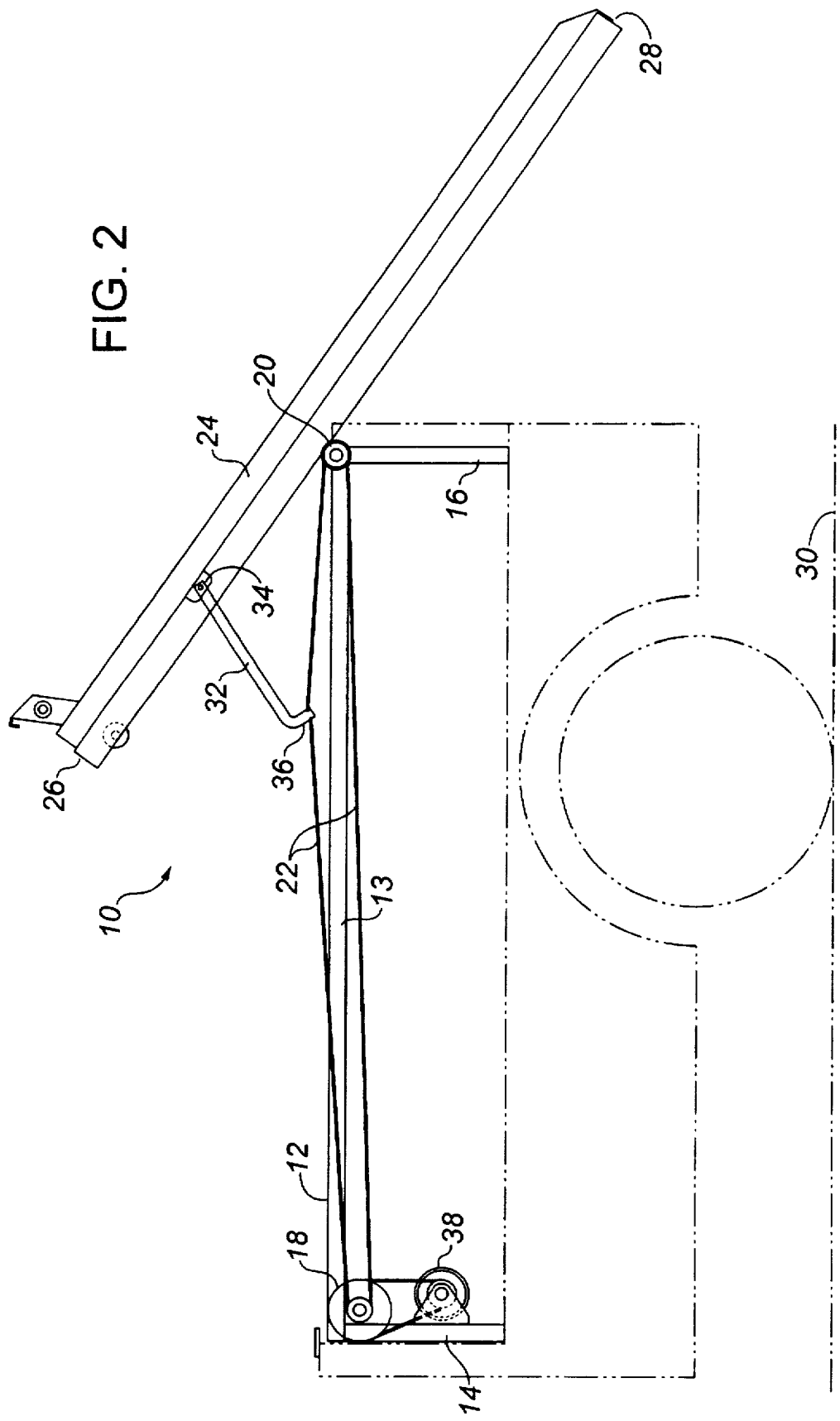
FIG. 2 is a longitudinal section view of the motor driven tiltable cargo deck illustrated in FIG. 1, with the deck in the process of being lowered.
Figure 3:
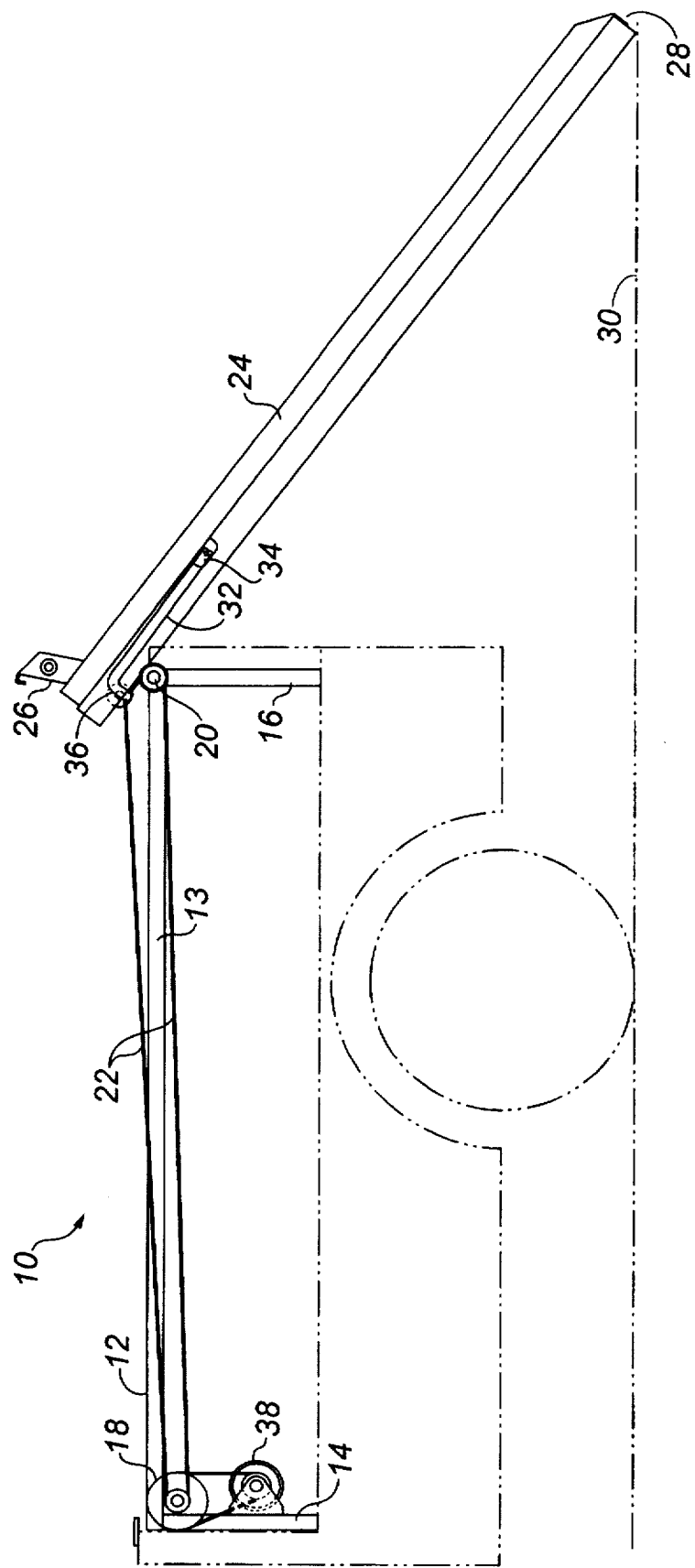
FIG. 3 is a longitudinal section view of the motor driven tiltable cargo deck illustrated in FIG. 1, with the deck in a loading/unloading position.

The preferred embodiment, a motor driven tiltable cargo deck generally identified by reference numeral 10, will now be described with reference to FIGS. 1 through 3.

Cargo deck 10 includes a support frame 12 having a pair of opposed sides 13, a first end 14 and a second end 16. A first pair of sprockets 18 are rotatably mounted adjacent first end 14 of support frame 12. A second pair of sprockets 20 are rotatably mounted adjacent second end 16 of support frame 12. A pair of continuous chains 22 are mounted for rotation about first pair of sprockets 18 and second pair of sprockets 20. A deck 24 is provided having a first end 26 and a second end 28. Deck 24 is supported by support frame 12. Deck 24 is slidably movable from a travel position in which first end 26 is adjacent first end 14 of support frame 12 to an unloading position in which second end 28 of deck 24 rests upon a groundsurface 30. A pair of linkage arms 32 are provided, each of which has a first end 34 and a second end 36. First ends 34 are pivotally mounted to deck 24 adjacent first end 26. Second ends 36 are attached to pair of chains 22. A drive motor 38 is provided for rotating first pair of sprockets 18 thereby rotating chains 22 and effecting movement of deck 24 relative to support frame 12.

The use and operation of motor driven tiltable cargo deck 10 will now be described with reference to FIGS. 1 through 3. Deck 24 moves relative to support frame 12 upon movement of chains 22. Movement of chains 22 is effected through drive motor 38. Were chains 22 connected directly to first end 26 of deck 24, a substantially vertical force vector would be exerted upon chains 22 when second end 28 of deck 24 was being lowered toward groundsurface 30, as illustrated in FIG. 2. The presence of linkage arms 32 alter the forces exerted upon chains 22. In view of connection between linkage arm 32, chains 22, and drive motor 38; linkage arms 32 exert a resisting force upon first end 26 of deck 24 as second end 28 of deck 24 is being lowered. Linkage arms 32 alter the direction of the force exerted upon chains 22 and define shifting force vectors. The shifting force vectors are illustrated in FIGS. 1 through 3. These force vectors are at all times exerting a force which has a sufficient horizontal component to be handled by the motor assembly, including drive motor 38, pairs of sprockets 18, 20 and pair of chains 22.

Motor driven tiltable cargo deck 10 provides a number of advantages. When driving a snowmobile onto deck 24 the connection between linkage arms 32, chains 22, and drive motor 38 provides a resisting force that holds deck 24 in position. With previous cargo deck configurations there was often movement of deck 24. Linkage arms 32 and chains 22 pull deck 24 straight, even when the load on deck 24 is distributed unevenly. With previous cargo deck configurations efforts had to be made to distribute the load evenly or the deck would bind.

It will be apparent to one skilled in the art that modifications may be made to the illustrated embodiment without departing from the spirit and scope of the invention as defined by the claims.

The embodiments of the invention in which an exclusive property or privilege is claimed are as follows:

1. The motor driven tiltable cargo deck, comprising:

a. a support frame having opposed sides, a first end and a second end;

b. a first pair of sprockets mounted to opposed sides adjacent the first end of the support frame;

c. a second pair of sprockets mounted to opposed sides adjacent the second end of the support frame;

d. a pair of continuous chains rotatably mounted between the first pair of sprockets and the second pair of sprockets;

e. a rigid deck having a first end and a second end supported by the support frame and slidably movable from a travel position in which the first end of the deck is adjacent the first end of the support frame to an unloading position in which the first end of the deck is positioned immediately adjacent to the second end of the support frame and the second end of the deck rests upon a groundsurface;

f. a pair of rigid linkage arms having a first end and a second end, the first ends of the linkage arms being pivotally mounted in a fixed position adjacent to the first end of the deck, the second ends of the linkage arms being attached to the chains, the linkage arms serving as a rigid connection between the deck and the chains whereby the deck moves relative to the support frame upon movement of the chains, the angular positioning of the linkage arms relative to the chains changing as the linkage arms exert a resisting force upon the first end of the deck to enable the second end of the deck to be lowered in a controlled manner; and g. a drive motor for rotating one of the first pair of sprockets and the second pair of sprockets thereby rotating the chains to effect movement of the deck relative to the support frame.

* * * * *